United States Patent Office
3,476,546
Patented Nov. 4, 1969

3,476,546
BICYCLO(2,2,2)OCT-5-ENE-2,3-DICARBOXYLIC
ANHYDRIDES AS HERBICIDES
Gwyneth M. Roberts, Doncaster, Victoria, Faye E. Butt,
North Balwyn, Victoria, Asbjorn Baklien, Kingsbury,
Victoria, Jocelyn M. Gregory, Croydon, Victoria, and
Jan Kuiper, Wagga Wagga, New South Wales, Australia,
assignors to Imperial Chemical Industries of Australia
and New Zealand Limited, Melbourne, Victoria,
Australia
No Drawing. Filed Dec. 2, 1965, Ser. No. 511,251
Claims priority, application Australia, Dec. 17, 1964,
53,063/64
Int. Cl. A01n 17/00, 9/24; C07d 5/32
U.S. Cl. 71—88                                    3 Claims

ABSTRACT OF THE DISCLOSURE

Selective herbicidal compositions of matter containing as active ingredient a compound of the formula:

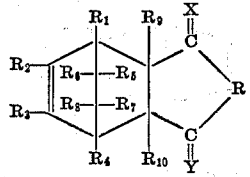

wherein X and Y are oxygen; R is oxygen or

D, E and $R_1$ to $R_{10}$ inclusive, which may all be the same or different, are hydrogen, halogen or alkyl containing up to 3 carbon atoms and D and E may be linked to form a 6-membered ring whenever they stand for alkyl provided, however, that $R_9$ and $R_{10}$ stand for hydrogen whenever R is

---

This invention relates to new compositions of matter having useful biological, particularly fungicidal and herbicidal properties.

Accordingly we provide new compositions of matter comprising as the biologically active ingredient at least one compound of the formula

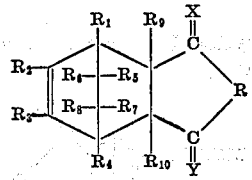

Formula I wherein X and Y, which may be the same or different, are O or S; R is selected from the group consisting of O, NR',

and

R' is selected from the group consisting of hydrogen, alkyl, alkenyl, aryl, alkylamino, arylamino, dialkylamino, amino, thiazolyl, —$SCZ_3$ wherein Z is Cl, Br or F and —$SCQCl.CQ'Cl_2$ wherein Q and Q', which may be the same or different, are H or Cl; R", R''', D, E and $R_1$ to $R_{10}$ inclusive, which may all be the same or different, are hydrogen, halogen or alkyl and D and E may be linked to form a 6-membered ring whenever they stand for alkyl provided, however, that $R_9$ and $R_{10}$ stand for hydrogen whenever R is

and an inert carrier therefor.

The numbering of the positions of the substituents used throughout this specification whenever R is oxygen or NR' is given in Formula Ib:

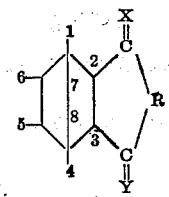

Formula Ib

The numbering for compounds where

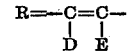

is given in Formula Ic:

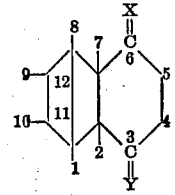

Formula Ic

Typical compounds incorporated in our compositions are e.g.

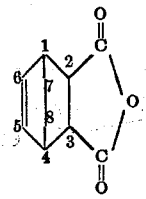

Bicyclo(2,2,2)oct-5-ene-2,3-dicarboxylic anhydride;

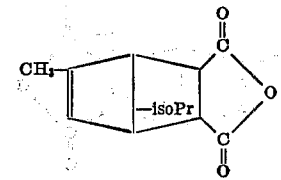

5 - methyl - 7 - isopropylbicyclo(2,2,2)oct - 5 - ene - 2,3-dicarboxylic anhydride;

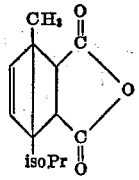

1 - isopropyl - 4 - methylbicyclo(2,2,2)oct - 5 - ene - 2,3-dicarboxylic anhydride;

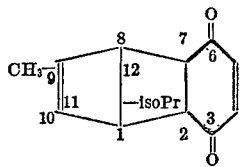

9 - methyl - 11 - isopropyl - 3,6 - dioxotricyclo(6,2,2,0$^{2,7}$) dodeca-4,9-diene

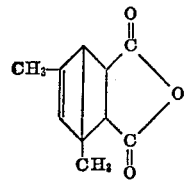

1,5 - dimethylbicyclo(2,2,2)oct - 5 - ene - 2,3 - dicarboxylic anhydride;

and the following new compounds

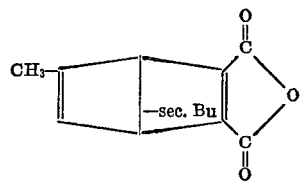

7 - sec.butyl - 5 - methylbicyclo(2,2,2) - oct - 5 - ene - 2,3-dicarboxylic anhydride;

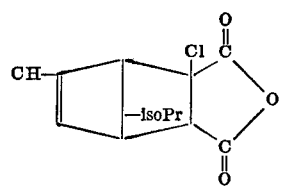

2 - chloro - 6 - methyl - 8 - isopropylbicyclo(2,2,2)oct - 5-ene-2,3-dicarboxylic anhydride;

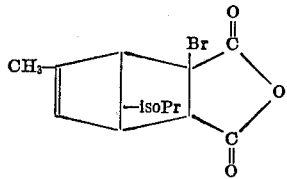

2 - chloro - 5 - methyl - 7 - isopropylbicyclo(2,2,2)oct - 5-ene-2,3-dicarboxylic anhydride

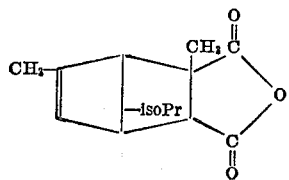

2 - bromo - 6 - methyl - 8 - isopropylbicyclo(2,2,2) - oct-5-ene-2,3-dicarboxylic anhydride;

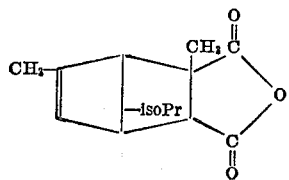

2,6 - dimethyl - 8 - isopropylbicyclo(2,2,2) - oct - 5 - ene-2,3-dicarboxylic anhydride;

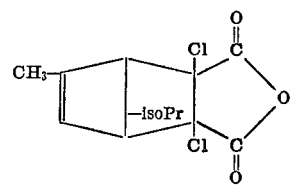

2,3 - dichloro - 5 - methyl - 7 - isopropylbicyclo(2,2,2) oct-5-ene-2,3-dicarboxylic anhydride;

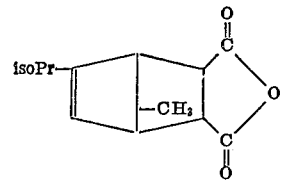

7 - methyl - 5 - isopropylbicyclo(2,2,2) - oct - 5 - ene - 2,3-dicarboxylic anhydride;

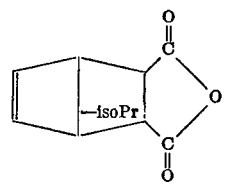

7 - isopropylbicyclo(2,2,2) - oct - 5 - ene -2,3 - dicarboxylic anhydride;

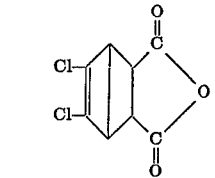

1,5,8,8 - tetramethylbicyclo(2,2,2) - oct - 5 - ene - 2,3 - dicarboxylic anhydride;

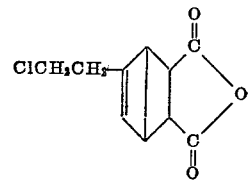

5,6 - dichlorobicyclo(2,2,2) - oct - 5 - ene - 2,3 - dicarboxylic anhydride;

5 - (β - chloroethyl)bicyclo(2,2,2) - oct - 5 - ene - 2,3 - dicarboxylic anhydride;

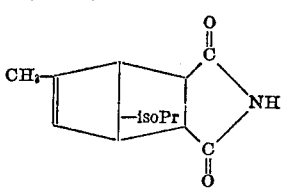

5-methyl-7-isopropylbicyclo(2,2,2)-oct-5-ene - 2,3 - dicarboximide;

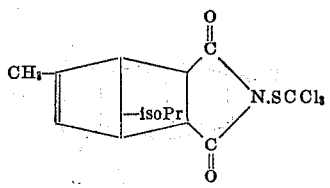

N-(trichloromethylthio)-5-methyl - 7 - isopropylbicyclo-(2,2,2)-oct-5-ene-2,3-dicarboximide;

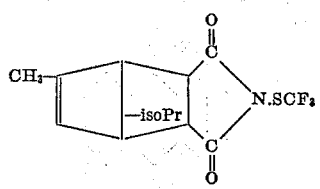

N-(trifluoromethylthio)-5-methyl - 7 - isopropylbicyclo-(2,2,2)-oct-5-ene-2,3-dicarboximide;

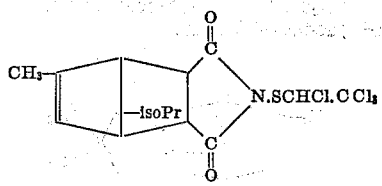

N - (1,2,2,2-tetrachloroethylthio)-5-methyl-7-isopropylbicyclo-(2,2,2)-oct-5-ene-2,3-dicarboximide;

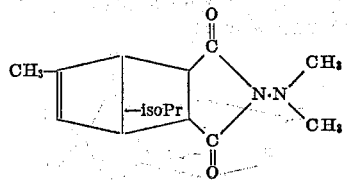

N-dimethylamino-5-methyl - 7 - isopropylbicyclo(2,2,2) oct-5-ene-2,3-dicarboximide;

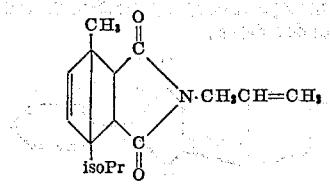

N-allyl-1-isopropyl-4-methylbicyclo-(2,2,2)-oct - 5 - ene-2,3-dicarboximide;

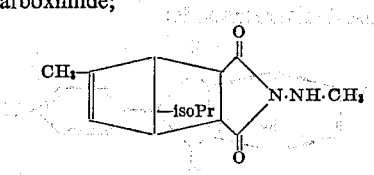

N-(methylamino)-5-methyl - 7 - isopropylbicyclo(2,2,2) oct-5-ene-2,3-dicarboximide;

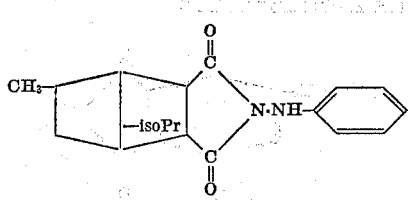

N-(anilino)-5-methyl-7-isopropylbicyclo(2,2,2) - oct - 5-ene-2,3-dicarboximide;

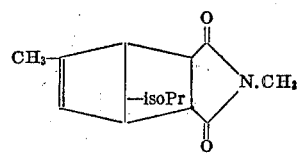

N,5-dimethyl-7-isopropylbicyclo(2,2,2)-oct - 5 - ene-2,3-dicarboximide;

N-(2-thiazolyl)-5-methyl-7-isopropylbicyclo(2,2,2) - oct-5-ene-2,3-dicarboximide;

N - amino - 5 - methyl-7-isopropylbicyclo(2,2,2)-oct-5-ene-2,3-dicarboximide;

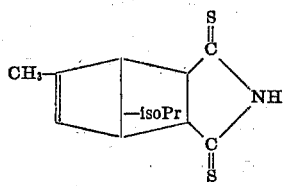

5-methyl-7-isopropylbicyclo(2,2,2)-oct-5-ene-2,3 - dithiodicarboximide;

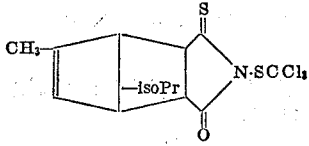

N-(trichloromethylthio)-5-methyl - 7 - isopropylbicyclo-(2,2,2)oct-5-ene-2,3-monothiodicarboximide;

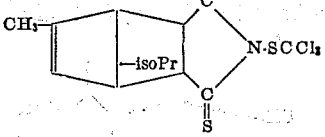

N - (trichloromethylthio)-5-methyl-7-isopropylbicyclo-(2,2,2)oct-5-ene-2,3-dithiodicarboximide;

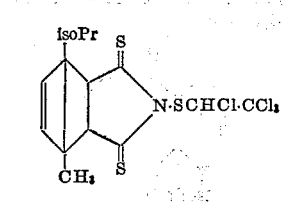

3,476,546

N - (1,2,2,2-tetrachloroethylthio)-1-isopropyl-4-methylbicyclo(2,2,2)oct-5-ene-2,3-dithiodicarboximide;

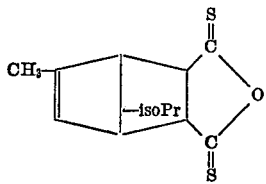

5-methyl-7-isopropylbicyclo(2,2,2)oct-5-ene-2,3 - dithionodicarboxylic anhydride;

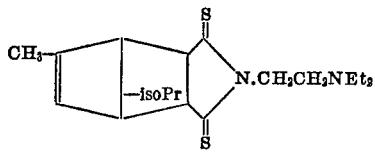

N-(2-diethylaminoethyl)-5-methyl - 7 - isopropylbicyclo-(2,2,2)oct-5-ene-2,3-dithiodicarboximide;

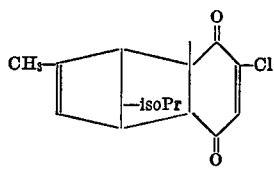

4 - chloro-10-methyl-12-isopropyl-3,6-dioxotricyclo(6,2,2, 0$^{2,7}$)dodeca-4,9-diene;

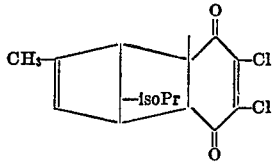

4,5 - dichloro-10-methyl-12,isopropy-3,6-dioxotricyclo(6, 2,2,0$^{2,7}$)dodeca-4,9-diene;

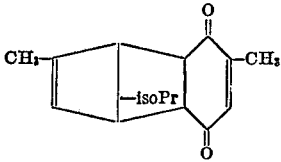

4,10 - dimethyl-12-isopropyl-3,6-dioxotricyclo(6,2,2,0$^{2,7}$) dodeca-4,9-diene;

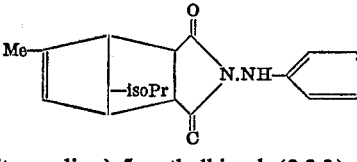

N-(p-nitroanalino)-5-methylbicyclo(2,2,2)-oct - 5 - ene-2,3-dicarboxamide;

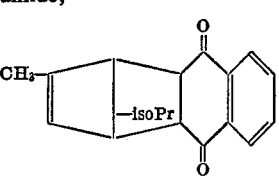

9 - methyl-11-isopropyl-3,6-dioxo-4,5-benzobicyclo(6,2,2, 0,$^{2,7}$)-dodeca-4,9-diene;

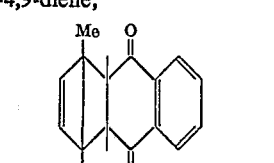

1-methyl-8-isopropyl-3,6-dioxo - 4,5 - benzobicyclo(6,2,2, 0$^{2,7}$)-dodeca-4,9-diene;

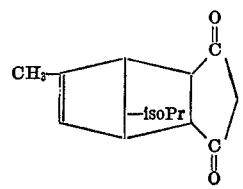

8-methyl-10-isopropyl - 3,5 - dioxotricyclo - (5,2,2,0$^{2,6}$) undec-8-ene;

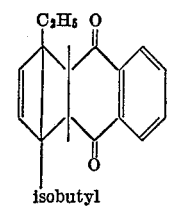

1-ethyl-8-isobutyl-3,6-dioxo-4,5-benzobicyclo (6,2,2,0$^{2,6}$)dodeca-4,9-diene;

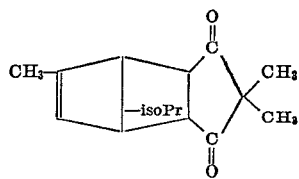

4,4,8-trimethyl-10-isopropyl-3,5-dioxotricyclo (5,2,2,0$^{2,6}$) undec-8-ene;

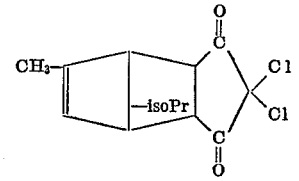

4,4-dichloro-8-methyl-10-isopropyl-3,5-dioxotricyclo (5,2,2,0$^{2,6}$) undec-8-ene;

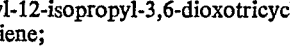

N-phenyl-5-methyl-7-isopropylbicyclo(2,2,2) oct-5-ene-2,3-dicarboxamide;

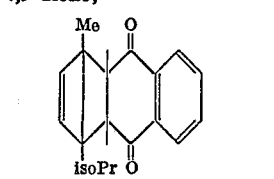

N-(p-tolyl)-5-methyl-7-isopropylbicyclo(2,2,2) oct-5-ene-2,3-dicarboxamide;

5-methyl-7-isopropylbicyclo(2,2,2)oct-5-ene-
2,3-monothiodicarboxylic anhydride;

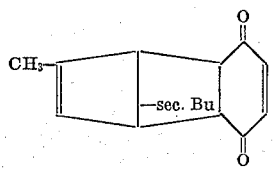

3,6-dioxo-11-sec.butyl-9-methyltricyclo-(6,2,2,0²,⁷)
dodeca-4,9-diene;

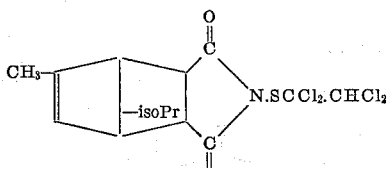

N-(1,1,2,2-tetrachloroethyl)-5-methyl-7-isopropyl-
bicyclo(2,2,2)oct-5-ene-2,3-dicarboximide.

By inert carrier we mean either a liquid or a solid diluent used to obtain the desired concentration and to facilitate handling. For most purposes liquid formulations to be used in sprays are most convenient and among these again, aqueous liquid formulations are preferred. The latter may conveniently be prepared from emulsifiable solutions of the active compounds in organic solvents by dissolving the active ingredients in a solvent which is non-toxic to the medium to be treated, particularly non-phytotoxic solvents e.g. in xylene, toluene, kerosene or the methylated naphthalenes, adding an emulsifier and/or wetting agent and emulsifying the solution in water. A typical emulsifiable concentration composition of this type would comprise 20% of the active ingredient, 40% kerosene, 35% xylene and 5% of an alkyl aryl polyether alcohol emulsifier, all quantities on a weight basis.

Alternatively our mixtures may also be formulated into dusts by combining them with solid inert carriers such as powdered chalk, talcs, kieselguhr, bentonite and other colloidal clays.

They may also be formulated as dispersible powders by milling the active ingredient to a fine powder, optionally together with an inert solid carrier as above disclosed and adding furthermore a dispersing agent finely ground with a colloidal clay.

Suitable emulsifying and dispersing agents are known from the prior art; anionic, cationic and non-ionic agents may be used. A suitable non-ionic emulsifier is e.g. the condensation product of nonylphenol with ethylene oxide available commercially under the trademark "Lissapol" N; suitable dispersing agents are e.g. the disodium salt of dinaphthlymethanedisulphonate, sodium lauryl sulphonate and the condensation product of alkylphenol with ethylene oxide available commercially under the trademark "Lubrol" E and many others known in the art.

Our compositions are fungicides effective particularly against obligate fungi e.g. tobacco blue mould (*Peronospora tabacina*), powdery mildew *Podosphaera leucotricha* (apples), *Erysiphe graminis* (wheat) and *Erysiphe cichoracaerum* (pumpkins). Certain of our compositions have also shown post-emergence herbicidal activity and acaricidal activity. Thus we have found that certain isopropylmethylbicyclo(2,2,2)oct - 5 - ene-2,3-dicarboxylic anhydrides are highly selective herbicides; e.g. 2 - chloro - 6-methyl-8-isopropylbicyclo(2,2,2)oct-5-ene-2,3-dicarboxylic anhydride kills mustard weed selectively in certain cereal and other crops without serious effect on the crop e.g. in wheat, rye, sorghum, rice and also in cotton, lucerne and beans, and N-(1,2,2,2-tetrachloroethylthio)-5 - methyl-7-isopropylbicyclo(2,2,2)oct-5-ene-2,3-dicarboximide kills mustard weed at dosages at which it does not damage wheat, oats or cotton. A further particularly preferred selective weedicidal formulation according to this invention comprises 1-isopropyl-4-methyl-bicyclo(2,2,2)oct - 5 - ene-2,3,-dicarboxylic anhydride; we have found that it is extremely effective in combating barnyard grass in cereal crops at large and in rice in particular; it eradicates this weed at dosages of about 2 lb./acre and less while valuable crops such as oats and particularly rice, but also cotton, remain unaffected or slightly and only temporarily retarded at substantially higher dosages. The selectivity against barnyard grass in rice is particularly valuable since barnyard grass (*Echinochloa crus-galli*) is the most prevalent and troublesome weed in rice and is so similar to rice. It is difficult to distinguish from rice at the early stages of growth and therefore difficult to eradicate manually and also similar to rice in its response to chemical agents and therefore difficult to control chemically. Consequently to date only very few effective and selective agents against barnyard grass in rice have been found. Yet another compound, 2,3 - dichloro - 5-methyl-7-isopropylbicyclo(2,2,2)oct-5-ene-2,3-dicarboxylic anhydride exhibits moderate anthelmintic and tickicidal activity; 2,6-dimethyl-8-isopropylbicyclo(2,2,2)oct-5-ene-2,3-dicarboxylic anhydride, 1-isopropyl - 4-methylbicyclo(2,2,2)oct-5-ene-2,3-dicarboxylic anhydride and 5-methyl-7-isopropylbicyclo(2,2,2)oct-5-ene-2,3-dicarboxylic anhydride exhibit some acaricidal activity.

Many of the active compounds of our new compositions of mater are new compounds. Accordingly we also provide new compounds according to Formula I wherein X, Y, R and $R_1$ to $R_{10}$ inclusive are as defined in claim 1 characterised in that at least one of the radicals X and Y is sulphur.

Furthermore we provide new compounds according to Formula I wherein X and Y are oxygen; R is

or

R" and R''', which may be the same or different, are hydrogen, halogen or alkyl; D' and E', which may be the same or different, are halogen or alkyl and, whenever D' and E' are alkyl groups, may be linked to form a 6-membered ring; and $R_1$ to $R_{10}$ inclusive are as defined in claim 1.

We also provide new compounds of Formula I wherein X, Y and R are oxygen, $R_1$ to $R_8$ inclusive are as defined in claim 1 and $R_9$ and $R_{10}$, which may be the same or different, are chlorine, bromine or methyl.

Particularly preferred new compounds suitable as active ingredients in our compositions are the compounds of the Formula I wherein X and Y and R are oxygen; $R_1$, $R_3$, $R_4$, $R_5$, $R_6$ and $R_8$ are hydrogen; $R_2$ is methyl; $R_7$ is isopropyl and $R_9$ and $R_{10}$, which may be the same or different, are selected from the group consisting of chlorine, bromine and methyl.

Other new compounds suitable as active ingredients of our compositions are the compounds according to Formula I wherein X and Y are oxygen; R is $NR^{IV}$ and $R^{IV}$ is alkyl, alkenyl, aryl, alkylamino, arylamino, dialkylamino, amino, thiazolyl, $—SCZ_3$ wherein Z is Cl, Br or F and $—SCQCl·CQ'Cl_2$ wherein Q and Q', which may be the same or different, are H or Cl; and $R_1$ to $R_{10}$, which may be the same or different, are hydrogen, alkyl or halogen.

Yet other new compounds are the compounds according to Formula I wherein X and Y are oxygen; R is NR'; $R_2$ is methyl, $R_7$ is isopropyl and $R_1$, $R_3$, $R_4$, $R_5$, $R_6$, $R_8$, $R_9$ and $R_{10}$ are hydrogen and R' is as defined in claim 1.

Preferred are the compounds in which $R_2$ is methyl and $R_7$ is isopropyl and $R_1$, $R_3$ to $R_6$ inclusive, and $R_8$ to $R_{10}$ inclusive are hydrogen, and the compounds in which $R_1$ is isopropyl and $R_4$ is methyl and $R_2$, $R_3$, and $R_5$ to $R_{10}$ inclusive are hydrogen.

We also provide a process of manufacturing compounds of the Formula I as defined in column 1, which process comprises reacting 1,3-cyclohexadienes of the formula

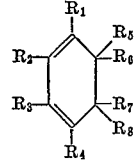

Formula II with a compound of the formula

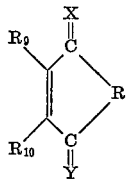

Formula III wherein R, $R_1$ to $R_{10}$ inclusive, X and Y are as defined above, in a Diels-Alder condensation.

We have found furthermore that the above process is also operative when the substituents X, Y and R are as defined above and, in addition, when X and Y are oxygen, R is NR' and R' and $R_1$ to $R_{10}$ inclusive are as defined above.

Compounds of Formula III include e.g. maleic thiono- and dithionoanhydrides, thiomaleimides, dithiomaleimides and cyclopentene-3,5-dithiones.

The reaction is carried out with or without a solvent, at temperatures from —10° to 200° C. at atmospheric or higher pressures. Suitable solvents are e.g. benzene, toluene, ethanol, chloroform. The temperature is dependent on the type of reactants, e.g. 20°–50°–100°–150° C.

Suitable 1,3-cyclohexadienes are α-phellandrene, α-terpinene, 1-methylcyclohexa-1,3-diene, 2-methylcyclohexa-1,3-diene, 5-methylcyclohexa - 1,3 - diene, 1-isopropylcyclohexa-1,3-diene, 2-isopropylcyclohexa-1,3-diene, 5-isopropylcyclohexa-1,3-diene, 2-methyl-5-ethylcyclohexa-1,3-diene, 2 - methyl - 5-sec.butylcyclohexa-1,3-diene, 1-chlorocyclohexa-1,3-diene, 2-bromocyclohexa - 1,3-diene, 2,5 - dichlorocyclohexa-1,3-diene, 1,3-dimethylcyclohexa-1,3 - diene-1,3,5,5-tetramethylcyclohexa-1,3-diene, 2,3-dichlorocyclohexa-1,3-diene.

A further process of the invention leading to compounds of the formula

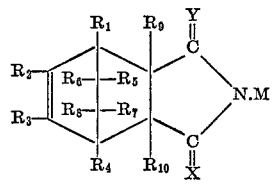

Formula IV comprises reacting a compound of the formula

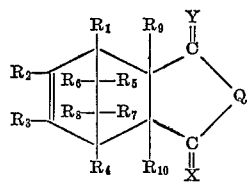

wherein Q is O, $R_1$ to $R_{10}$ inclusive and X and Y are as defined in claim 1, with a compound of the formula $M \cdot NH_2$, where M is selected from the group consisting of alkyl, alkenyl, alkylamino, arylamino, dialkylamino, amino and thiazolyl. The reaction is usually carried out under pressure if $M \cdot NH_2$ is volatile and at elevated temperatures, e.g. 70–150° C., and preferably in a solvent, e.g. MeOH, EtOH. Alternatively in this process $R_2$ may be methyl, $R_7$ may be isopropyl and then M may also be hydrogen.

Yet another process of manufacturing compounds of the formula

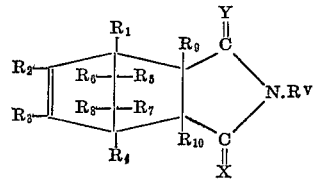

Formula V wherein X, Y and $R_1$ to $R_{10}$ inclusive are as defined above, comprises reacting a compound of the formula

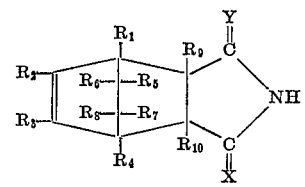

with a compound $R^VZ'$ where $Z'$ is halogen and $R^V$ is as defined in connection with R' above in the presence of an acid acceptor such as NaOH, KOH, $NaOC_2H_5$, $NaNH_2$, etc.

Yet another process for the manufacture of compounds of the formula

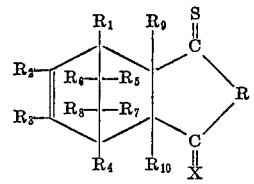

Formula VI wherein X, R and $R_1$ to $R_{10}$ inclusive are as defined above, comprises reacting a compound of the formula

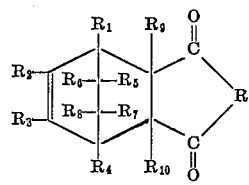

Formula VII with $P_2S_5$ or $P_2S_3$ or $PSCl_3$ in a suitable solvent, e.g. benzene.

When the desired product is a compound of Formula VI bearing a sulphur atom as the substituent X, the process may be carried out in two successive steps, wherein the first step leads to a compound VI having an oxygen atom as substituent X which compound, in the second step, is then reacted further with $P_2S_5$ or $P_2S_3$ or $PSCl_3$.

Our invention is illustrated by, but not limited to the following examples.

EXAMPLE 1

2-chloro-6-methyl-8-isopropylbicyclo(2,2,2) oct-5-ene-2,3-dicarboxylic anhydride A solution of chloromaleic anhydride (9.7 g.) and α-phellandrene (10 g.) in toluene (10 ml.) was heated in a sealed pressure tube at 135° C. for 3 hours. The cooled product was removed from the tube and distilled in vacuo to give a forerun consisting of toluene, a little unreacted chloromaleic anhydride and α-phellandrene followed by a main fraction of B.P. 130–3°/10.2 mm. Hg, which soon solidified. It was shown by nuclear magnetic resonance and infra-red spectroscopy and elemental analysis to be the required compound together with a small amount of the 3-chloro-isomer.

EXAMPLE 2

2,3-dichloro-5-methyl-7-isopropylbicyclo(2,2,2)oct-5-ene-2,3-dicarboxylic anhydride Dichloromaleic anhydride (11.7 g.), α-phellandrene (9.5 g.) and toluene (10 ml.) were reacted as described in Example 1. Distillation of the reaction product in vacuo gave a sublimate consisting of some unreacted dichloromaleic anhydride, a forerun consisting of toluene and unreacted α-phellandrene, and a main fraction of B.P. 135–8°/15 mm. Hg shown by nuclear magnetic resonance spectroscopy, infra-red spectroscopy and elemental analysis to be the required compound.

EXAMPLE 3

9-methyl-11-isopropyl-3,6-dioxotricyclo(6,6,2,0$^{2,7}$) dodeca-4,9-diene p-Benzoquinone (32 g.) and α-phellandrene (41 g.) were heated under reflux in alcohol (80 ml.) for 2 hours. The alcohol was then distilled off to leave the crude product as a dark crystalline mass. Recrystallisation from petroleum ether gave the pure compound, M.P. 118° C.

EXAMPLE 4

5-methyl-7-isopropylbicyclo(2,2,2)oct-5-ene-2,3-dicarboxylic anhydride

A solution of α-phellandreen (100 g.) and maleic anhydride (70 g.) in benzene (120 ml.) was heated at 50° C. for 1 hour. The solvent was then evaporated off and the product recrystallised from methanol, M.P. 127° C.

EXAMPLE 5

5-methyl-7-isopropylbicyclo(2,2,2)oct-5-ene-2,3-dicarboximide 5-methyl-7-isopropylbicyclo(2,2,2)oct-5-ene - 2,3 - dicarboxylic anhydride (11.6 g.) and 80 ml. of alcohol saturated with ammonia at 20° C. were heated in a carius tube at 150° C. for 1 hour. The cooled reaction product was removed from the tube and the solvent removed by evaporation. The almost pure product could be further purified by recrystallisation from benzene/petroleum ether, M.P. 141° C.

EXAMPLE 6

N-(trichloromethylthio)-7-isopropyl-5-methylbicyclo(2,2,2)oct-5-ene-2,3-dicarboximide 5-methyl-7-isopropyl(2,2,2)oct-5-ene - 2,3 - dicarboximide (4.7 g.) and sodium hydroxide (0.8 g.) were dissolved in 40 ml. of water in a 100 ml. flask. To this solution was added trichloromethane chloride (3.7 g.). The flask was stoppered and shaken for 1 hour. The mixture was extracted with two 30 ml. portions of ether, the ether extract dried over sodium sulphate, filtered and the ether removed by distillation. This left the desired compound as a nearly colourless solid.

EXAMPLE 7

1-isopropyl-4-methylbicyclo(2,2,2)oct-5-ene-2,3-dicarboxylic anhydride

α-Terpinene (50 g.) and maleic anhydride (35 g.) in benzene (60 ml.) were heated under reflux for 1 hour. Evaporation of the solvent yielded the crude compound which was purified by recrystallisation from methanol, M.P. 60° C.

EXAMPLE 8

N-(trifluoromethylthio)-7-isopropyl-5-methylbicyclo(2,2,2)oct-5-ene-2,3-dicarboximide This was prepared as described in Example 6 using trifluoromethane sulphenyl chloride (2.75 g.) instead of trichloromethane sulphenyl chloride.

EXAMPLE 9

1-isopropyl-4-methylbicyclo(2,2,2)oct-5-ene-2,3-dicarboximide

This was prepared from the corresponding dicarboxylic anhydride as described in Example 5, M.P. 155° C.

EXAMPLE 10

N-(1,2,2,2-tetrachloroethylthio)-1-isopropyl-4-methylbicyclo(2,2,2)oct-5-ene-2,3-dicarboximide This was prepared from 1-isopropyl-4-methylbicyclo(2,2,2)oct-5-ene-2,3-dicarboximide and 1,2,2,2 - tetrachloroethane sulphenyl chloride by the method described in Example 6.

EXAMPLE 11

5-methyl-7-isopropylbicyclo(2,2,2)oct-5-ene-2,3-dithiocarboximide 5-methyl-7-isopropylbicyclo(2,2,2)oct-5-ene - 2,3 - dicarboximide (23.3 g.) and phosphorous pentasulphide (25 g.) in 350 ml. of xylene was heated under reflux for 5 hours. After concluded reaction the clear solution was separated from some insoluble material and the solvent removed by distillation in vacuo. The crude product was recrystallised from MeOH. Infra-red spectroscopy and elemental analysis showed that the product consisted in the main of the desired compound together with some 5-methyl-7-isopropylbicyclo(2,2,2)-oct-5-ene-2,3 - monothiodicarboximide.

EXAMPLE 12

N-trichloromethylthio-7-isopropyl-5-methylbicyclo(2,2,2)oct-5-ene-2,3-dithiocarboximide The product obtained in Example 11 was reacted with trichloromethane sulphenyl chloride as described in Example 6 to give the desired compound.

EXAMPLE 13

7-sec.butyl-5-methylbicyclo(2,2,2)oct-5-ene-2,3-dicarboxylic anhydride 2-methyl-5-sec.butyl-1,3-cyclohexadiene was reacted with maleic anhydride as described in Example 4 to yield the desired compound.

EXAMPLE 14

3,6-dioxo-11-sec.butyl-9-methyltricyclo(6,2,2,0$^{2,7}$) dodeca-4,9-diene

2 - methyl - 5 - sec.butyl - 1,3 - cyclohexadiene and p-benzoquinone were reacted as described in Example 3 to give the desired compound.

EXAMPLE 15

N-(dimethylamino)-7-sec.butyl-5-methylbicyclo(2,2,2)oct-5-ene-2,3-dicarboximide

7 - sec.butyl - 5 - methylbicyclo(2,2,2)oct - 5 - ene - 2,3-dicarboxylic anhydride (12.4 g.) and 1,1 - dimethylhydrazine (3.5 g.) in 50 ml. of alcohol were heated in a sealed tube at 130° C. for 4 hours. Removal of solvent and excess 1,1-dimethylhydrazine in vacuo left the crude product which was purified by recrystallisation from methanol.

EXAMPLE 16

3,5-dioxo-10-isoproyl-8-methyl-tricyclo(5,2,2,0$^{2,6}$) undec-8-ene

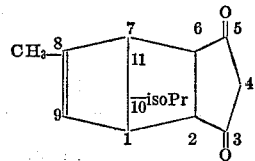

Cyclopentene-3,5-dione (19.2 g.) and α-phellandrene (28 g.) were dissolved in 100 ml. of benzene. The mixture was heated, with stirring, at 70° C. for 3 hours. The solvent and unreacted α-phellandrene were distilled off under reduced pressure and the residue recrystallised from methanol.

EXAMPLE 17

3,5-dioxo-1-isopropyl-7-methyltricyclo(5,2,2,0$^{2,6}$) undec-8-ene

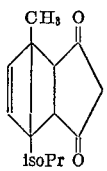

Cyclopentene-3,5-dione (9.6 g.) and α-terpinene (14 g.) were dissolved in 100 ml. of toluene and the solution heated under reflux for 6 hours. Solvent and unreacted α-terpinene were distilled off under reduced pressure. The residue was distilled in vacuo to yield the tricyclic compound as an oil which soon solidified.

EXAMPLE 18

N-(p-tolyl)-5-methyl-7-isopropylbicyclo(2,2,2) oct-5-ene-2,3-dicarboximide

A mixture of 5-methyl-7-isopropylbicyclo(2,2,2)oct-5-ene-2,3-dicarboxylic anhydride (23.4 g.) and p-toluidine (10.7 g.) in toluene (400 ml.) was heated under reflux in a Dean and Stark apparatus for 6 hours. The toluene was then removed by distillation in vacuo and the product recrystallised from petroleum ether (B.P. 80–100° C.) to yield the desired compound.

EXAMPLE 19

N-dimethylamino-1-methyl-4-isopropylbicyclo(2,2,2) oct-5-ene-2,3-dicarboximide

1 - methyl - 4 - isopropylbicyclo(2,2,2)oct - 5 - ene-2,3-dicarboxylic anhydride was reacted with a 20% molar excess of 1,1-dimethylhydrazine in alcohol as described in Example 5 to yield the desired compound.

EXAMPLE 20

N-amino-7-isopropyl-5-methylbicyclo(2,2,2)oct-5-ene-2,3-dicarboximide

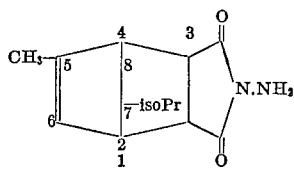

10 grams of the α-phellandrene-maleic anhydride adduct and 12 g. of hydrazine hydrate were heated in ethanol in a sealed tube at 150° C. for 1 hour. Solvent and unreacted hydrazine were removed by distillation in vacuo and the residue recrystallised from aqueous methanol, M.P. 89–90° C.

EXAMPLE 21

25 g. of 5 - methyl - 7 - isopropylbicyclo(2,2,2)oct-5 - ene - 2,3 - dicarboxylic anhydride (compound A), 2 - chloro - 6 - methyl - 8 - isopropylbicyclo(2,2,2)oct-5 - ene - 2,3 - dicarboxylic anhydride (compound B), 9 - methyl - 11 - isopropyl - 3,6 - dioxotricyclo(6,2,2,0$^{2,7}$) dodeca - 4,9 - diene (compound C) and N - trichloromethylthio - 5 - methyl - 7 - isopropylbicyclo(2,2,2)oct-5-ene-2,3-dicarboximide (compound D) each were dissolved in 70 ml. of toluene and 10 ml. of the surfactant marketed under the registered trademark "Triton" X100 (isooctyl phenyl ether of polyethylene glycol) were added. The volume of each preparation was then made up to 100 ml. with further toluene. These formulations were then emulsified by mixing with water to concentrations of 0.05% and 0.2% w./v. of active ingredient. Then 200 ml. of each emulsion were sprayed in a spray cabinet onto the following group of plants: a pot of 30.5" tall wheat plants; a pot of 30.5" tall oat plants; a box of nine 4 week old tobacco plants and two 7" tall tomato plants. In addition, for comparison, dispersible powders of zineb (zinc ethylene-1,2-bisdithiocarbamate) and "Karathane" (registered trademark for 2,4-dinitro-6-(2-octyl)phenyl crotonate) were sprayed onto further plants as examples of fungicides well known to give highly effective control of the diseases shown in Table I. Twenty-four hours after spraying, the plants were infected in the following manner. Tomatoes were inoculated with a concentrated spore suspension of *Alternaria solani* and tobacco with a concentrated spore suspension of *Peronospora tabacina*. The oat seedlings were inoculated by dusting with spores of *Puccinia coronata* taken from infected plant material. Wheat seedlings were inoculated with *Erysiphe graminis* in a similar manner. After inoculation, the wheat was returned to the glass-house and the oats, tobacco and tomatoes were placed in a high humidity cabinet for 24 hours and then returned to the glass-house. The tomatoes and wheat were assessed for disease and phytotoxic symptoms 4 days, the oats 8 days, after inoculation. The tobacco plants were returned to the humidity cabinet 6 days after inoculation for a period of 24 hours and then returned to the glass-house and assessed on the 7th day. The rating procedures for disease and phytotoxicity, and the results are given at the bottom of Table I.

TABLE I

| Compound No.: | Concentration, percent w./v. | *Puccinia coronata* Disease | *Puccinia coronata* Phytotoxity | *Erysiphe graminis* Disease | *Erysiphe graminis* Phytotoxity | *Alternaria solani* Disease | *Alternaria solani* Phytotoxity | *Peronspora tabacina* Disease | *Peronspora tabacina* Phytotoxity |
|---|---|---|---|---|---|---|---|---|---|
| A | 0.05 | 3 | 0 | 3 | 0 | 0 | 0 | 0 | 0 |
|   | 0.2 | 0 | S | 0 | TB | 0 | SLS | 0 | SLS |
| B | 0.05 |   |   |   |   | 3 | 0 | 1 | SLS |
|   | 0.2 | 0 | S | 1 | 0 | 1 | SLS | 0 | S |
| C | 0.05 | 1 | 0 | 3 | 0 | 3 | 0 | 0 | 0 |
|   | 0.2 | 0 | 0 | 2 | 0 | 2 | 0 | 0 | 0 |
| D | 0.05 | 2 | 0 | 1 | 0 | 0 | 0 | 0 | 0 |
|   | 0.2 | 0 | 0 | 0 | 0 | 0 | 0 | 0 | 0 |
| Zineb | 0.05 | 0 | 0 |   |   | 0 |   | 1 | 0 |
|   | 0.2 | 0 | 0 |   |   | 0 |   | 0 | SLS |
| "Karathene" | 0.05 |   |   | 0 | 0 |   |   |   |   |

Phytotoxicity ratings: 0=No toxicity observed; TB=Tip burn; SLS=Slight scorch; S=Moderate scorch.
Disease ratings: 0=0-25% diseased; 1=25-50% diseased; 2=50-75% diseased; 3=75-100% diseased.

EXAMPLE 22

Chemicals designated A, B, C and D in Example 21 and 4,10-dimethyl-12-isopropyl-3,6-dioxotricyclo(6,2,2, 0$^{2,7}$)dodeca-9,9-diene, designated E, were formulated and tested against the species shown in Table II according to the procedure described in Example 21, against which species they had shown promise in Example 21. In addition, the formulations of chemicals A and D which had shown activity against *Erysiphe graminis* were sprayed on to apple seedlings which were later inoculated by dusting with spores of *Podosphaera leucotricha* and on to pumpkin seedlings later inoculated by dusting with spores of *Ersiphe cichoracearum*. After inoculation, the apple and pumpkin seedlings were returned to the glass-house and assessed for disease and phytotoxicity on the 8th day. The scale for assessing phytotoxicity is shown at the bottom of Table II. The amount of disease produced by *Alternaria solani* was assessed by counting the lesions on the tomato seedlings and expressing the number as a percentage of those on control seedlings which did not receive fungicide. The amount of disease produced by *Peronospora tobacina* was assessed by counting the number of diseased seedlings from 4 boxes of nine seedlings each for each concentration of each fungicide and expressing the number as a percentage of the diseased seedlings in 4 control boxes. For the other diseases, the amount of disease produced was assessed on an arbitrary rating system from 0=no disease to 5=maximum disease. As reference standards the well-known fungicides maneb (Manganous ethylene bisdithiocarbamate) and Karathane (registered trademark for 2,4-dinitro-6-(2-octyl)phenyl crotonate) were tested in the same manner as compounds A, B, C and D against the species of fungi shown in Table II, which are typical fungi for which they are used in practice.

Results are given in Table II.

24 hours before spraying with 30 adult mites of *Tetranychus telarius* per leaf. Four days after spraying the live and dead mites were counted and a percentage mortality figure was obtained by comparison with mortality occurring on plants sprayed with control emulsions, that is with an emulsion of the formulation described above omitting the test chemicals. Results are shown in Table III.

TABLE III

| | Concentration, Percent w./v. | Percent Mortality of mites at 4 days after spraying |
|---|---|---|
| Compound No.: | | |
| A | 0.03 | 10 |
| | 0.1 | 55 |
| | 0.3 | 97 |
| G | 0.03 | 0 |
| | 0.1 | 32 |
| | 0.3 | 85 |
| H | 0.03 | |
| | 0.1 | 47 |
| | 0.3 | 100 |

EXAMPLE 24

20 g. of 1-isopropyl-4-methylbicyclo(2,2,2)oct-5-ene-2,3-dicarboxylic anhydride were dissolved in 70 mls. of toluene. Then 9 mls. of the surfactant marketed under the registered trademark "Triton" X100 (iso-octyl phenyl ether of polyethylene glycol) were added, and the volume made up to 100 ml. with further toluene. This formulation was emulsified in water, and the emulsion was applied at a range of dilutions as shown inn Table IV through a small spraying boom on to boxes of soil in which various seedlings were growing. The boxes were passed under the boom on an endless belt moving at a pre-determined constant speed.

TABLE II

| | Concentration, percent w./v. | Puccinia coronata | | Erysiphe graminis | | Podosphaera leucotricha | | Erysiphe cichoracaerum | | Peronospora tabacina | | Alternaria solani | |
|---|---|---|---|---|---|---|---|---|---|---|---|---|---|
| | | Disease | Phytotoxicity | Disease | Phytotoxicity | Disease | Phytotoxicity | Disease | Phytotoxicity | Disease | Phytotoxicity | Disease | Phytotoxicity |
| Compound No.: | | | | | | | | | | | | | |
| A | 0.0016 | | | | | | | | | 100 | | | |
| | 0.008 | 1 | 0 | 5 | 0 | 3 | 0 | 5 | 0 | 77 | 0 | 60.8 | 0 |
| | 0.04 | 0 | SLS | 0 | 0 | 0 | 0 | 1 | 0 | 0 | SLS | 33.4 | 0 |
| | 0.2 | 0 | S | 0 | SLS | 0 | 0 | 0 | S | 0 | S | 0 | S |
| B | 0.0016 | | | | | | | | | 100 | 0 | | |
| | 0.008 | | | | | | | | | 100 | 0 | | |
| | 0.04 | | | | | | | | | 12 | SLS | | |
| | 0.2 | | | | | | | | | 0 | S | | |
| C | 0.0016 | | | | | | | | | 100 | 0 | | |
| | 0.008 | | | | | | | | | 70 | 0 | | |
| | 0.04 | | | | | | | | | 0 | 0 | | |
| | 0.2 | | | | | | | | | 0 | SLS | | |
| D | 0.0016 | 5 | 0 | 5 | 0 | 5 | 0 | | | 67 | 0 | 31.7 | 0 |
| | 0.008 | 5 | 0 | 3 | 0 | 5 | 0 | | | 33 | 0 | 7.3 | 0 |
| | 0.04 | 5 | 0 | 0 | 0 | 1 | 0 | | | 11 | 0 | 1.8 | 0 |
| | 0.2 | 1 | 0 | 0 | 0 | 0 | 0 | | | 11 | 0 | 0.9 | 0 |
| Maneb | 0.0016 | | | | | | | | | 100 | 0 | 17.9 | 0 |
| | 0.008 | 1 | | | | | | | | 100 | 0 | | 0 |
| | 0.04 | 0 | | | | | | | | 50 | SLS | 8.5 | 0 |
| | 0.2 | 0 | | | | | | | | 0 | S | 8.2 | 0 |
| E | 0.008 | 4 | 0 | | | | | | | | | | |
| | 0.04 | 0 | 0 | | | | | | | | | | |
| | 0.2 | 0 | 0 | | | | | | | | | | |
| "Karathane" | 0.008 | | | 0 | | 0 | | 0 | 0 | | | | |
| | 0.04 | | | 0 | | 0 | | 0 | SLS | | | | |
| | 0.2 | | | 0 | | 0 | | 0 | SVS | | | | |
| Water Control | | 5 | 0 | 5 | 0 | 5 | 0 | 5 | 0 | 100 | 0 | 100 | 0 |

Phytotoxicity ratings: 0=No toxicity observed; S=Moderate scorch; SLS=Slight scorch; SVS=Severe scorch.

EXAMPLE 23

Compound A of Example 21, 2,6-dimethyl-8-isopropyl-bicyclo(2,2,2)oct-5-ene-2,3-dicarboxylic anhydride (designated G in Table III) and 1-isopropyl-4-methylbicyclo-(2,2,2)oct-5-ene-2,3-dicarboxylic anhydride (designated H in Table III) were formulated as described in Example 21. These formulations were emulsified in water to give concentrations of 0.3%, 0.1% and 0.3% w./v. of each active chemical. The emulsions were sprayed on to French bean plants with leaves cut to 1 inch square and infested After three weeks the plants were observed for the effect of the chemical, and phytotoxicity ratings were carried out. The concentrations used and results for the chemical and for a control formulation, from which the active chemical was omitted, are shown in Table IV. In Table IV N indicates no effect, S indicates scorch, St indicates stunting, i.e., both S and St indicate relatively minor and often temporary effects; $K_1$ indicates that 25 to 50% of all plants treated, $K_2$ indicates that 50 to 75% of all plants treated and $K_3$ indicates that 75 to 100% of all plants treated, were killed. The arrow → indicates an intermediate stage between the effects shown.

The high kill on barnyard grass and mustard and the resistance of rice, oats, cotton, beans and others demonstrate the selectivity of the compound.

TABLE IV

[Selective Herbicidal Effect of 1-isopropyl-4-methylbicyclo(2,2,2)oct-5-ene-2,3-dicarboxylic anhydride]

| | Concentration of active ingredient in aqueous solution, w./v. percent | | | |
|---|---|---|---|---|
| | 0.1 | 0.2 | 0.4 | 0.6 |
| | Rate of application of active ingredient in lbs./acre | | | |
| | 1 | 2 | 4 | 6 |
| Maize | N | N | $K_2$ | $K_3^1$ |
| Wheat | N | N | S→N | $K_1^2$ |
| Oats | N | N | S→N | $K_1^2$ |
| Rye | N | $K_1$ | $K_1$ | $K_1^2$ |
| Sorghum | S→St | $K_1$ | $K_1$ | $K_1^2$ |
| Rice | N | S→N | S→N | $K_1$ |
| Barnyard grass | St | $K_3$ | $K_3$ | $K_3$ |
| Clover | S→St | $K_3$ | $K_3$ | $K_3$ |
| Lucerne | S→St | $K_2$ | $K_3$ | $K_3$ |
| Beet | S→St | $K_2$ | $K_3$ | $K_3$ |
| Carrots | N | $K_2$ | $K_3$ | $K_3$ |
| Onion | N | $K_2$ | $K_3$ | $K_3$ |
| Tomatoes | N | S→N | S→N | S→St |
| Mustard | $K_1$ | $K_2$ | $K_3$ | $K_3$ |
| Cotton | N | S→St | S→St | $K_1$ |
| Peas | N | S→St | St | $K_1$ |
| Control | 0 | 0 | 0 | 0 |

EXAMPLE 25

Several formulations $F_1$, $F_2$ and $F_3$ as defined below in this example of 1 - isopropyl - 4 - methylbicyclo(2,2,2) oct - 5 - ene - 2,3 - dicarboxylic anhydride were mixed with water at concentrations shown below and applied through a small spraying boom onto boxes of soil in which there were growing alternating rows of rice and barnyard grass seedlings. The boxes were passed under the boom on an endless belt moving at a pre-determined constant speed so as to achieve application of a known dosage of pounds per acre of the active chemical. There were four boxes each containing 20 rice and 20 barnyard grass seedlings for every rate of each of the formulations of the above-named test chemical and, for comparison, also four boxes each for two commercially available weedkillers, namely "Stam" (registered trademark) which is 3',4'-dichloropropionanilide and "Ordram" (registered trademark) which is ethyl-N-cycloheptylthiolcarbamate. Four further boxes were treated with the same quantities of water, solvent and surfactant mixture as described for formulation $F_1$, but without the active ingredient, and four more boxes were treated with the quantities of water, solvents and surfactant described for formulation $F_2$ but, again, without the active ingredient. The mean result obtained from the latter eight boxes was used as the control green weight. After spraying, all the boxes were placed in large metal trays in the glasshouse and subjected to periods of drying and flooding with water as required and indicated below. 3 weeks after application of the chemical at the stage of development indicated in the tables, namely the 1- or 2- or 3-leaf stage respectively, the plants were cut at soil level and their green weights were determined. These green weights were then compared with the green weights of the control plants. The difference expressed as a percentage of the weight of the control plants is the "percentage reduction in green weight" listed in the tables, which shows to what extent the chemicals affected the growth of the rice and barnyard grass. Table V demonstrates the selective weedkilling effect of 1-isopropyl-4-methylbicyclo(2,2,2)oct-5-ene-2,3-dicarboxylic anhydride on barnyard grass and rice when applied as post emergence treatment at an early stage (1-leaf stage) of the rice. The formulations were as follows:

$F_1$ 50 g. of 1 - isopropyl - 4 - methylbicyclo(2,2,2)oct-5-ene-2,3-dicarboxylic anhydride,
5 g. of the condensation product of one mole of an equimolar mixture of cetyl- and oleyl-alcohols with 10 moles of ethylene oxide made up to 100 mls. with toluene and emulsified in water to give the concentration of the active ingredient stated in Table V.

$F_2$ 40 g. of 1 - isopropyl - 4 - methylbicyclo(2,2,2)oct-5-ene-2,3-dicarboxylic anhydride,
9 g. of "Teric" N 13 (registered trademark, Imperial Chemical Industries of Australia and New Zealand Limited) a condensation product of 1 mole of nonylphenol with 9 moles of ethylene oxide, 6 g. of calcium dodecylbenzenesulphonate, made up to 100 mls. with a mixture of equal volumes of cyclohexanone and toluene, emulsified in water to concentrations of active ingredient stated in Table V.

$F_3$ 40 g. of 1 - isopropyl - 4 - methylbicyclo(2,2,2)oct-5-ene-2,3-dicarboxylic anhydride,
15 g. of "Teric" N 9 (registered trademark, Imperial Chemical Industries of Australia and New Zealand Limited) a condensation product of 1 mole of nonylphenol with 9 moles of ethylene oxide, made up to 100 mls. with cyclohexanone and diluted with water to the concentrations of the active ingredient shown in Table V.

The subsequent irrigation treatments were as follows:

A=sub-irrigation to base of plants.
B=plants flooded 24 hours after spraying to a depth of 1½" of water, maintained under water for 24 hours, allowed to dry at atmospheric conditions and after drying flooded again for 24 hours.
C=plants flooded 48 hours after spraying, to a depth of 1½" of water, maintained under water for 24 hours, allowed to dry at atmospheric conditions and then flooded again for 24 hours.
D=plants flooded 72 hours after spraying, to a depth of 1½" of water, maintained under water for 24 hours, allowed to dry at atmospheric conditions and then flooded again for 24 hours.

Similar treatments were also carried out at the 2-leaf and 3-leaf stage, but on the whole the percentage kill on the weed was somewhat lower at the 2-leaf and considerably lower at the 3-leaf stage i.e. treatment was most effective at the 1-leaf stage. Results obtained for comparison with commercially available weedkillers for barnyard grass in rice, namely "Stam" and "Ordram," are also given in Table V.

Since the latter are most effective at different developments of the rice plant, namely at the 2-leaf stage ("Stam") and with pre-emergence treatment ("Ordram") respectively, figures for the commercial products are given at these most favourable stages—i.e. all compositions are compared at their respective most effective stages of application.

TABLE V

[1-isopropyl-4-methylbicyclo(2,2,2)oct-5-ene-2,3-dicarboxylic anhydride Applied to Rice and Barnyard Grass at the 1-Leaf Stage]

| | Treatment with active ingredient | | Percent reduction green weight of rice using flooding treatment | | | | Percent reduction green weight of barnyard grass using flooding treatment | | | |
|---|---|---|---|---|---|---|---|---|---|---|
| | Concentration, w./v. | Rate, lbs./acre | A | B | C | D | A | B | C | D |
| Formulation: | | | | | | | | | | |
| F₁ | 0.2 | 2 | 0 | 1.5 | 0 | 2.4 | 85.5 | 88.6 | 98.3 | 98.5 |
| F₁ | 0.4 | 4 | 18.9 | 2.9 | 0 | 0 | 100 | 98.0 | 99.9 | 98.7 |
| F₂ | 0.2 | 2 | 0 | 7.3 | 0 | 0 | 92.8 | 85.3 | 96.3 | 98.2 |
| F₂ | 0.4 | 4 | 29.8 | 9.2 | 0.7 | 23.7 | 94.1 | 97.4 | 96.2 | 97.1 |
| F₃ | 0.2 | 2 | 0 | 3.1 | 0 | 19.0 | 85.9 | 90.1 | 80.8 | 95.6 |
| F₃ | 0.4 | 4 | 21.3 | 0 | 0 | 6.7 | 98.0 | 93.3 | 96.8 | 99.6 |
| Comparison with Commercially Available Product at 1 Leaf Stage | | | | | | | | | | |
| "Stam" 34 | 0.2 | 2 | 25.4 | 11.1 | 0 | 33.4 | 99.4 | 96.9 | 70.6 | 99.2 |
| Comparison with Commercially Available Product at 3 Leaf Stage | | | | | | | | | | |
| "Stam" 34 | 0.2 | 2 | 21.9 | 0 | 6.2 | 14.1 | 100 | 98.8 | 99.7 | 99.9 |
| Comparison with Commercially Available Product—Pre-emergence application | | | | | | | | | | |
| "Ordram" | 0.2 | 2 | 0.9 | | | | 80.7 | | | |
| "Ordram" | 0.4 | 4 | 10.9 | | | | 90.5 | | | |

EXAMPLE 26

A formulation of 2 - chloro - 6 - methyl - 8-isopropyl-bicyclo(2,2,2)oct - ene - 2,3 - dicarboxylic anhydride was prepared as described in Example 25 (Formula F₁) for 1 - isopropyl - 4 - methylbicyclo(2,2,2)oct - 5 - ene-2,3-dicarboxylic anhydride. The formulated compound was then tested in the manner described in Example 24. The selective effect against mustard weed, compared with the resistance of cultivated crops e.g. maize, wheat, rye, sorghum, rice, cotton, and beans is shown in Table VI. The annotations N, S, St, $K_1$, $K_2$, and $K_3$ are as described in Example 24.

TABLE VI

[Selective herbicidal effect of 2-chloro-6-methyl-8-isopropylbicyclo(2,2,2)oct-5-ene-2,3-dicarboxylic anhydride]

| | Concentration of active ingredient in aqueous emulsion w./v. percent | |
|---|---|---|
| | 0.4 | 0.6 |
| | Rate of application of active ingredient in lbs./acre | |
| | 4 | 6 |
| Maize | S→N | S→N |
| Wheat | Tip burn→N | $K_1$ |
| Rye | N | $K_1$ |
| Sorghum | N | N |
| Rice | N | Tip burn→N |
| Lucerne | Tip burn→N | S→N |
| Beet | $K_3$ | $K_3$ |
| Carrots | $K_3$ | $K_3$ |
| Onions | $K_1$ | $K_3$ |
| Tomatoes | $K_3$ | $K_3$ |
| Beans | S→N | S→N |
| Mustard | $K_3$ | $K_3$ |
| Cotton | $K_3$ | $K_3$ |

We claim:

1. A process for combatting the growth of weeds in growing cereal crops which comprises treating said crops with an effective amount of a compound of the formula:

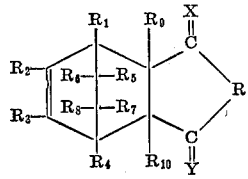

wherein X and Y are oxygen; R is oxygen and $R_1$ to $R_{10}$ inclusive, which may all be the same or different, are hydrogen or alkyl containing up to 3 carbon atoms.

2. A process according to claim 1 wherein said active ingredient is 1 - isopropyl - 4 - methylbicyclo(2,2,2)oct-5-ene-2,3-dicarboxylic anhydride.

3. A process of combatting the growth of barnyard grass weed in rice crops according to claim 1, which process comprises firstly treating said crops with a composition containing 1 - isopropyl - 4 - methylbicyclo(2,2,2)oct - 5 - ene - 2,3 - dicarboxylic anhydride, said composition being applied post-emergence in concentrations of between 2 to 4 pounds of active ingredient per acre, secondly flooding said crop at least once to a depth of 1½ inches with water 24 to 72 hours after treatment, thirdly maintaining the water at flood level for 24 hours after flooding and fourthly allowing the water to evaporate.

References Cited

UNITED STATES PATENTS

| | | | |
|---|---|---|---|
| 1,944,731 | 1/1934 | Diels et al. | 260—123 |
| 2,237,356 | 4/1941 | Merrill | 167—30 |
| 2,507,207 | 5/1950 | Hyman. | |
| 2,524,145 | 10/1950 | Tawney | 260—326 |
| 2,556,664 | 6/1951 | Smith et al. | 71—95 |
| Re. 24,435 | 2/1958 | Gilbert et al. | |
| 3,122,560 | 2/1964 | Rigterink | 71—95 |
| 3,138,615 | 6/1964 | Bluestone | 71—95 |
| 3,198,811 | 8/1965 | Weil | 71—88 |
| 3,320,270 | 5/1967 | Grogan et al. | 260—306.8 |
| 3,326,934 | 6/1967 | Akamatsu et al. | 260—325 |
| 1,993,025 | 3/1935 | Peterson et al. | |
| 2,328,567 | 9/1943 | Matthews et al. | |
| 3,346,597 | 10/1967 | De Acetis | |
| 3,334,991 | 8/1967 | Hageman et al. | 71—88 |

OTHER REFERENCES

McCutcheon, "Detergents & Emulsifiers 1963 Annual" (1963).

LEWIS GOTTS, Primary Examiner

G. HOLLRAH, Assistant Examiner

U.S. Cl. X.R.

71—76, 90, 95, 98, 121, 123; 260—306.8, 326.5, 326.9, 346.6, 586; 424—274, 275, 278, 325, 331, 335